United States Patent
Tanaka

(10) Patent No.: US 11,175,082 B2
(45) Date of Patent: Nov. 16, 2021

(54) REFRIGERATION CYCLE APPARATUS WITH HEAT STORAGE FOR USE DURING DEFROST

(71) Applicant: Mitsubishi Electric Corporation, Tokyo (JP)

(72) Inventor: Chitose Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 121 days.

(21) Appl. No.: 16/496,076

(22) PCT Filed: Apr. 27, 2017

(86) PCT No.: PCT/JP2017/016776
§ 371 (c)(1),
(2) Date: Sep. 20, 2019

(87) PCT Pub. No.: WO2018/198275
PCT Pub. Date: Nov. 1, 2018

(65) Prior Publication Data
US 2020/0049392 A1 Feb. 13, 2020

(51) Int. Cl.
F25B 47/02 (2006.01)
F25B 30/02 (2006.01)
F25B 41/26 (2021.01)

(52) U.S. Cl.
CPC ........... *F25B 47/025* (2013.01); *F25B 30/02* (2013.01); *F25B 41/26* (2021.01)

(58) Field of Classification Search
CPC ......... F25B 30/02; F25B 41/26; F25B 47/025
USPC ........................................................ 62/278
See application file for complete search history.

(56) References Cited

U.S. PATENT DOCUMENTS

| | | | |
|---|---|---|---|
| 2013/0219927 A1* | 8/2013 | Kim ................ | F25B 13/00 62/77 |
| 2013/0227973 A1* | 9/2013 | Kang ............... | F25D 21/12 62/80 |
| 2015/0276281 A1* | 10/2015 | Satzger ............ | F25B 30/02 62/115 |

FOREIGN PATENT DOCUMENTS

| JP | S62-294856 A | 12/1987 |
|---|---|---|
| JP | H11-23036 A | 1/1999 |
| JP | 2009-287903 | * 12/2009 |
| JP | 2009-287903 A | 12/2009 |

(Continued)

OTHER PUBLICATIONS

International Search Report of the International Searching Authority dated Jul. 18, 2017 for the corresponding International application No. PCT/JP2017/016776 (and English translation).

(Continued)

*Primary Examiner* — Henry T Crenshaw
(74) *Attorney, Agent, or Firm* — Posz Law Group, PLC

(57) ABSTRACT

A refrigeration cycle apparatus causes refrigerant to circulate through a compressor, an indoor heat exchanger, an outdoor heat exchanger, a heat storage body, a first expansion valve, and a second expansion valve. The refrigeration cycle apparatus includes a bypass path and a first on-off valve provided in the bypass path. The bypass path branches off from a first portion that connects the indoor heat exchanger and the first expansion valve in a first refrigerant pipe, and leads to a fourth refrigerant pipe that connects a suction port of the compressor and a four-way valve. The first on-off valve is opened in a defrosting operation.

9 Claims, 7 Drawing Sheets

(56) References Cited

FOREIGN PATENT DOCUMENTS

| | | | |
|---|---|---|---|
| JP | 2013-075650 | * | 4/2013 |
| JP | 2013-075650 A | | 4/2013 |
| JP | 2016-153700 A | | 8/2016 |

OTHER PUBLICATIONS

Office Action dated Jun. 2, 2020 issued in the corresponding JP application No. 2019-514988 ( and English translation).

* cited by examiner

FIG.2

|  | SPECIFIC HEAT [kJ/kg·K] | DENSITY [kg/m$^3$] | HEAT CAPACITY PER VOLUME [kJ/m$^3$·K] |
|---|---|---|---|
| IRON | 0.460 | 7870 | 3620 |
| COPPER | 0.385 | 8900 | 3427 |
| ALUMINUM | 0.913 | 2700 | 2465 |

FIG.3

| OPERATION MODE | HEATING OPERATION | DEFROSTING PREPARATION OPERATION | DEFROSTING OPERATION | COOLING OPERATION |
|---|---|---|---|---|
| FOUR-WAY VALVE 2 | HEATING SIDE | HEATING SIDE | COOLING SIDE | COOLING SIDE |
| EXPANSION VALVE 4a | THROTTLE-CONTROLLED | PREFERABLY FULLY OPENED | THROTTLE-CONTROLLED | PREFERABLY FULLY OPENED |
| EXPANSION VALVE 4b | PREFERABLY FULLY OPENED | THROTTLE-CONTROLLED | THROTTLE-CONTROLLED | THROTTLE-CONTROLLED |
| ON-OFF VALVE 41 | CLOSED | CLOSED | FULLY OPENED | CLOSED |

<HEATING OPERATION>

<COOLING OPERATION>

<DEFROSTING OPERATION>

S7 * Or, temperature of refrigerant suctioned into compressor or temperature of refrigerant at outlet of outdoor heat exchanger becomes equal to or less than a prescribed value during the heating operation, or after a prescribed time period of the heating operation has elapsed (e.g., 60 minutes).

REFRIGERATION CYCLE APPARATUS WITH HEAT STORAGE FOR USE DURING DEFROST

CROSS REFERENCE TO RELATED APPLICATION

This application is a U.S. national stage application of International Application PCT/JP2017/016776 filed on Apr. 27, 2017, the contents of which are incorporated herein by reference.

TECHNICAL FIELD

The present invention relates to a refrigeration cycle apparatus, and particularly to a refrigeration cycle apparatus that performs a defrosting operation utilizing an amount of heat stored in a heat storage body for removing frost formed on an outdoor heat exchanger.

BACKGROUND

In a refrigeration cycle apparatus using air as a heat source, when the outdoor air temperature becomes lower than a prescribed temperature (for example, 7° C.) during a heating operation, the temperature in the outdoor heat exchanger becomes less than 0° C. Thus, frost forms on the outdoor heat exchanger. Formed frost blocks an air flow passage in the outdoor heat exchanger, and thereby the heating performance deteriorates. Accordingly, the defrosting operation for melting the frost has to be performed at regular time intervals.

Conventionally, this defrosting operation has been performed using, as a heat source, an amount of heat stored in indoor air, an indoor heat exchanger, an indoor/outdoor connection pipe and a compressor by operating a refrigeration cycle apparatus while switching a four-way valve of the refrigeration cycle apparatus into a cooling side.

However, in the above-mentioned operation system, indoor air is used as a heat source, and cold air is fed into the room that is supposed to be heated, so that the comfortableness inside the room is deteriorated. Furthermore, refrigerant is cooled by defrosting. When the refrigerant flows through the indoor heat exchanger, the indoor/outdoor connection pipe and the compressor, the refrigerant removes heat from these components. Accordingly, when the defrosting operation is ended and the heating operation is resumed, the above-mentioned components have to be heated again, which delays the increasing rate of the temperature of warm air blowing into the room.

For this reason, according to the technique disclosed in Japanese Patent Laying-Open No. 2009-287903 (PTL 1), a heat storage body is provided on a refrigeration cycle circuit. Heat is stored in the heat storage body during a heating operation. Then, the amount of stored heat is used as a heat source during a defrosting operation. Thereby, the defrosting performance is improved, the defrosting time is shortened, and liquid refrigerant is prevented from being returned to a compressor.

PATENT LITERATURE

PTL 1: Japanese Patent Laying-Open No. 2009-287903 (paragraph [0006], FIG. 1)

However, in the configuration of the heat storage body disclosed in the above-mentioned Japanese Patent Laying-Open No. 2009-287903, there is a problem that the pressure of the refrigerant flowing through the heat storage body cannot be adjusted during the defrosting operation, so that the amount of heat released from the heat storage body and the suction pressure of the compressor cannot be adjusted.

Specifically, when the pressure of the refrigerant flowing through a heat storage body during the defrosting operation is unnecessarily small, the temperature of the refrigerant flowing through the heat storage body falls. Thus, the amount of heat is transferred more than necessary from the heat storage body to the refrigerant, so that the temperature of the refrigerant suctioned into the compressor excessively rises. This also causes a problem that the temperature of the refrigerant discharged from the compressor is raised accordingly to be equal to or higher than a protection value (for example, 120° C.). Furthermore, when the pressure of the refrigerant flowing through the heat storage body during the defrosting operation is unnecessarily high, the amount of heat transferred from the heat storage body to the refrigerant is reduced. Thus, the liquid refrigerant cannot be completely evaporated and suctioned into the compressor. Then, lubricating oil inside the compressor is diluted with the refrigerant and reduced in viscosity. This also causes a problem that lubrication is poor in a compression mechanism.

SUMMARY

The present invention has been made to solve the above-described problems. An object of the present invention is to provide a refrigeration cycle apparatus characterized by shortening a defrosting time and accelerating recovery of the heating performance after the heating operation is resumed.

The present disclosure relates to a refrigeration cycle apparatus. The refrigeration cycle apparatus includes: a refrigerant circuit through which refrigerant circulates in a forward direction or an opposite direction to the forward direction sequentially through a compressor, an indoor heat exchanger, a first expansion valve, a heat storage body, a second expansion valve, and an outdoor heat exchanger, and back to the compressor; and a four-way valve configured to change a circulation direction of the refrigerant. The refrigerant circuit includes a first refrigerant pipe, a second refrigerant pipe, a third refrigerant pipe, a fourth refrigerant pipe, a fifth refrigerant pipe, a bypass path, and a first on-off valve. The first refrigerant pipe extends from the outdoor heat exchanger through the first expansion valve, the heat storage body and the second expansion valve to the indoor heat exchanger. The second refrigerant pipe connects the four-way valve and the indoor heat exchanger. The third refrigerant pipe connects the four-way valve and the outdoor heat exchanger. The fourth refrigerant pipe connects a suction port of the compressor and the four-way valve. The fifth refrigerant pipe connects a discharge port of the compressor and the four-way valve. The bypass path branches off from a first portion in the first refrigerant pipe and leads to the fourth refrigerant pipe, and the first portion connects the indoor heat exchanger and the first expansion valve. The first on-off valve is provided in the bypass path.

According to the present invention, a heat storage body is disposed on a refrigerant circuit, which connects an indoor heat exchanger and an outdoor heat exchanger, so as to be located between two expansion valves each having an adjustable degree of opening and provided on the refrigerant circuit. By the configuration as described above, heat of the refrigerant is stored in a heat storage body in a defrosting preparation operation, and heat is released from the heat storage body to the refrigerant in a defrosting operation, so as to be capable of implementing a defrosting heat source.

In this case, as the pressure of refrigerant flowing through the heat storage body is adjusted by two expansion valves, the amount of heat exchanged between the heat storage body and the refrigerant can be adjusted. Thereby, an appropriate operation state of the refrigeration cycle apparatus can be maintained.

BRIEF DESCRIPTION OF DRAWINGS

FIG. 2 is a diagram showing the characteristics of materials used as a heat storage body 5.

FIG. 3 is a diagram showing the controlled state of each of a four-way valve, expansion valves and an on-off valve in four operation modes.

DETAILED DESCRIPTION

Figure 1:
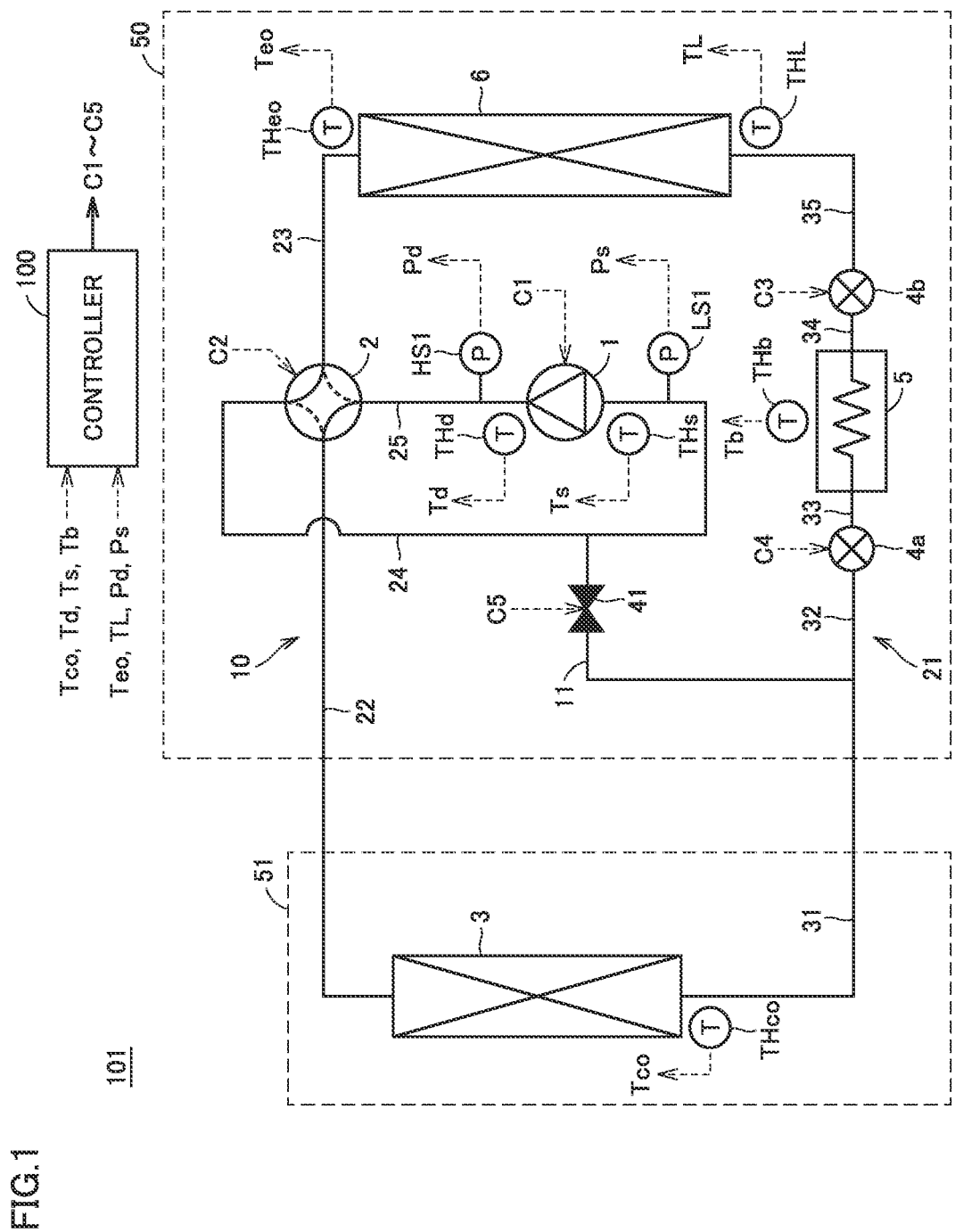
FIG. 1 is a refrigerant circuit diagram of a refrigeration cycle apparatus in the first embodiment.

The embodiments of the present invention will be hereinafter described in detail with reference to the accompanying drawings. In the following, while a plurality of embodiments will be described, it has been originally intended to combine the configurations described in each embodiment as appropriate. Also, the same or corresponding components in the accompanying drawings are designated by the same reference characters, and description thereof will not be repeated.

First Embodiment

FIG. 1 is a refrigerant circuit diagram of a refrigeration cycle apparatus in the first embodiment.

Referring to FIG. 1, a refrigeration cycle apparatus 101 includes a refrigerant circuit 10 through which refrigerant circulates in a forward direction or an opposite direction to the forward direction sequentially through a compressor 1, a four-way valve 2, an indoor heat exchanger 3, a first expansion valve 4a, a heat storage body 5, a second expansion valve 4b, an outdoor heat exchanger 6, and four-way valve 2, and back to compressor 1. The circulation direction of the refrigerant is changed by four-way valve 2 provided between compressor 1 and indoor heat exchanger 3, and also between compressor 1 and outdoor heat exchanger 6. Compressor 1, four-way valve 2, outdoor heat exchanger 6, heat storage body 5, first expansion valve 4a, and second expansion valve 4b are disposed in an outdoor unit 50. Indoor heat exchanger 3 is disposed in an indoor unit 51.

In the present embodiment, heat storage body 5 is disposed on a refrigerant circuit, which connects indoor heat exchanger 3 and outdoor heat exchanger 6, so as to be located between two expansion valves 4a and 4b each having an adjustable degree of opening and disposed on the refrigerant circuit. Thus, heat of the refrigerant is stored in heat storage body 5 in a defrosting preparation operation, and heat is released from heat storage body 5 to the refrigerant in a defrosting operation, and thereby heat storage body 5 is capable of implementing a defrosting heat source. As the pressure of the refrigerant flowing through heat storage body 5 is adjusted by expansion valves 4a and 4b, the amount of heat exchanged between heat storage body 5 and the refrigerant can be adjusted. Thereby, an appropriate operation state of the refrigeration cycle apparatus can be maintained.

Heat storage body 5 is disposed as a heat source during a defrosting operation. Heat storage body 5 is disposed in refrigerant circuit 10 so as to be located on first refrigerant pipe 21 that connects indoor heat exchanger 3 and outdoor heat exchanger 6. First expansion valve 4a is disposed in first refrigerant pipe 21 so as to be located between indoor heat exchanger 3 and heat storage body 5. Second expansion valve 4b is disposed in first refrigerant pipe 21 so as to be located between outdoor heat exchanger 6 and heat storage body 5.

FIG. 2 is a diagram showing the characteristics of materials used as heat storage body 5. Heat storage body 5 can be made using aluminum or an aluminum alloy. As compared with copper or iron, aluminum stores an amount of heat of about 70% per volume but is lightweight and inexpensive, so that aluminum is advantageous to be introduced into a product. FIG. 2 shows a comparison about specific heat, density and heat capacity per volume among iron, copper and aluminum.

Again referring to FIG. 1, refrigerant circuit 10 includes a first refrigerant pipe 21, a second refrigerant pipe 22, a third refrigerant pipe 23, a fourth refrigerant pipe 24, a fifth refrigerant pipe 25, a bypass path 11, and a first on-off valve 41. First refrigerant pipe 21 extends from indoor heat exchanger 3 through first expansion valve 4a, heat storage body 5 and second expansion valve 4b to outdoor heat exchanger 6. Second refrigerant pipe 22 connects four-way valve 2 and indoor heat exchanger 3. Third refrigerant pipe 23 connects four-way valve 2 and outdoor heat exchanger 6. Fourth refrigerant pipe 24 connects a suction port of compressor 1 and four-way valve 2. Fifth refrigerant pipe 25 connects a discharge port of compressor 1 and four-way valve 2.

First refrigerant pipe 21 includes a first portion, a second portion, a third portion, and a fourth portion. The first portion (pipes 31 and 32) extends from indoor heat exchanger 3 to first expansion valve 4a. The second portion (a pipe 33) extends from first expansion valve 4a to heat storage body 5. The third portion (a pipe 34) extends from heat storage body 5 to second expansion valve 4b. The fourth portion (a pipe 35) extends from second expansion valve 4b to outdoor heat exchanger 6. Bypass path 11 branches off from the portion between indoor heat exchanger 3 and first expansion valves 4a in first refrigerant pipe 21. Then, bypass path 11 is connected to fourth refrigerant pipe 24. The first portion of first refrigerant pipe 21 includes: a section connected via pipe 31 from indoor heat exchanger 3 to bypass path 11; and a section connected via pipe 32 from bypass path 11 to first expansion valve 4a. First on-off valve 41 is provided in bypass path 11.

Four-way valve 2, bypass path 11 and first on-off valve 41 are disposed in outdoor unit 50. Although not particularly limited, a controller 100 may be disposed in any of outdoor unit 50 and indoor unit 51 or may be disposed separately from outdoor unit 50 and indoor unit 51.

Four-way valve 2 is configured to be capable of bringing the communication state inside four-way valve 2 into the "first state" and the "second state". The "first state" indicates the state inside four-way valve 2, in which the discharge port of compressor 1 is in communication with second refrigerant pipe 22 connected to indoor heat exchanger 3 while the suction port of compressor 1 is in communication with third refrigerant pipe 23 connected to outdoor heat exchanger 6. Since this first state is employed mainly during heating, the first state is also referred to as a "heating side". The "second state" indicates the state inside four-way valve 2, in which the discharge port of compressor 1 is in communication with third refrigerant pipe 23 while the suction port of compressor 1 is in communication with second refrigerant pipe 22. Since this second state is employed mainly during cooling, it is also referred to as a "cooling side".

Controller 100 controls refrigeration cycle apparatus 101 in four operation modes. FIG. 3 is a diagram showing the controlled state of each of the four-way valve, the expansion valves and the on-off valve in four operation modes.

Referring to FIG. 3, four operation modes include a heating operation mode, a defrosting preparation operation mode, a defrosting operation mode, and a cooling operation mode. The present embodiment is characterized in that the defrosting preparation operation mode is interposed when the heating operation mode is shifted to the defrosting operation mode.

Four-way valve 2 is set in the first state (on the heating side) in the heating operation, and set in the second state (on the cooling side) in the defrosting operation. Also, four-way valve 2 is set in the first state (on the heating side) in the defrosting preparation operation and set in the second state (on the cooling side) in the cooling operation.

On-off valve 41 is set in a closed state in the heating operation and set in a fully opened state in the defrosting operation. Also, on-off valve 41 is set in a closed state in each of the defrosting preparation operation and the cooling operation.

In the heating operation, expansion valve 4a is throttle-controlled while expansion valve 4b is preferably controlled to be fully opened. In the defrosting preparation operation, expansion valve 4a is preferably controlled to be fully opened while expansion valve 4b is throttle-controlled. In the defrosting operation, expansion valve 4a and expansion valve 4b each are throttle-controlled. In the cooling operation, expansion valve 4a is preferably controlled to be fully opened while expansion valve 4b is throttle-controlled.

As apparent from the above description, controller 100 is configured to: when the heating operation is shifted to the defrosting operation, perform the defrosting preparation operation in such a manner that the degree of opening of first expansion valve 4a is increased to be greater than that in the heating operation (to be fully opened from the throttle-controlled state), and the degree of opening of second expansion valve 4b is reduced to be smaller than that in the heating operation (to be brought into a throttle-controlled state from the fully opened state); and to open first on-off valve 41 in the defrosting operation. In the following, the flow of the refrigerant in each operation mode will be described in greater detail.

(Heating Operation)

Figure 4:
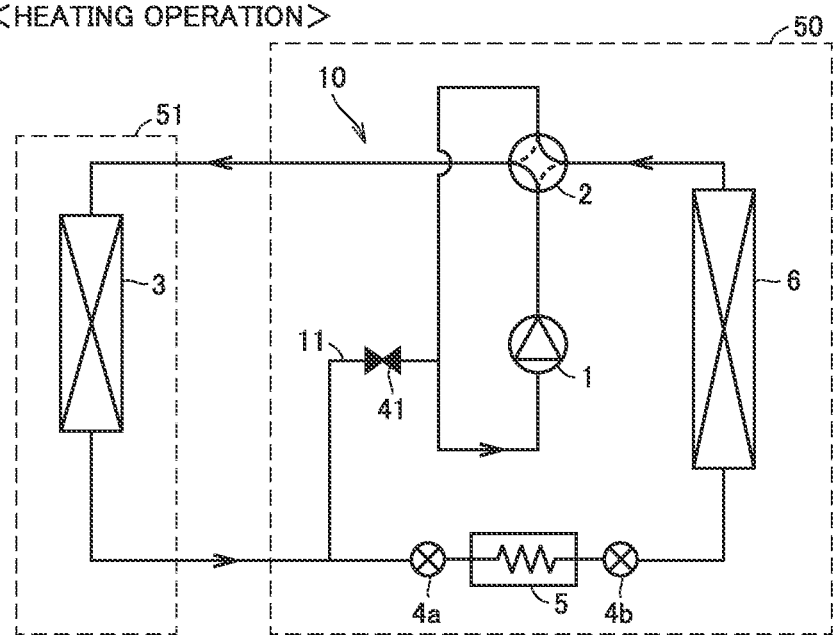
FIG. 4 is a diagram showing the flow of refrigerant in a heating operation.

FIG. 4 is a diagram showing the flow of refrigerant in a heating operation. Refrigerant flows sequentially through compressor 1, four-way valve 2, indoor heat exchanger 3, expansion valve 4a, heat storage body 5, expansion valve 4b, and outdoor heat exchanger 6, and then again flows through four-way valve 2, and arrives at compressor 1.

Since on-off valve 41 is opened only in the defrosting operation, the refrigerant does not flow through bypass path 11 in the heating operation.

In the heating operation, controller 100 switches four-way valve 2 such that the discharge side of compressor 1 is in communication with indoor heat exchanger 3 while the suction side of compressor 1 is in communication with outdoor heat exchanger 6, as shown in FIG. 4. The vapor refrigerant that is raised in temperature and pressure in compressor 1 passes through four-way valve 2 and flows into indoor heat exchanger 3. Indoor heat exchanger 3 functions as a condenser at this time. High-temperature and high-pressure vapor refrigerant releases heat to the indoor air introduced into indoor heat exchanger 3 by an indoor blower (not shown). Thereby, the vapor refrigerant condenses into high-pressure liquid refrigerant.

High-pressure liquid refrigerant flows through expansion valve 4a, and thereby expands and turns into gas-liquid two-phase refrigerant of low-temperature and low-pressure, which then flows into heat storage body 5. After a prescribed time period has elapsed since the start of the heating operation, heat storage body 5 is in temperature equilibrium with the refrigerant flowing through the heat storage body. Thus, no heat is transmitted and received between heat storage body 5 and the refrigerant. Then, the refrigerant flows into expansion valve 4b. In the heating operation, expansion valve 4b is basically set to the maximum degree of opening such that the pressure loss before and behind expansion valve 4b is minimized.

The refrigerant having passed through expansion valve 4b flows into outdoor heat exchanger 6. Outdoor heat exchanger 6 functions as an evaporator at this time. The gas-liquid two-phase refrigerant of low-temperature and low-pressure absorbs heat from the outdoor air introduced into outdoor heat exchanger 6 by an outdoor blower (not shown). Thereby, the gas-liquid two-phase refrigerant evaporates and turns into low-pressure vapor refrigerant. Then, the low-pressure vapor refrigerant is suctioned into compressor 1 through four-way valve 2. The refrigerant subsequently circulates through a refrigeration cycle in the same manner as described above.

(Cooling Operation)

Figure 5:
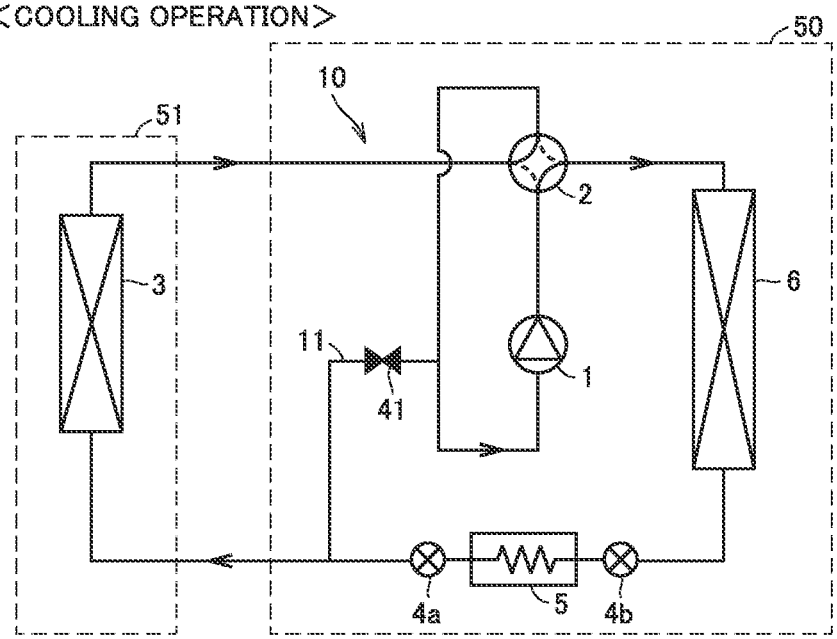
FIG. 5 is a diagram showing the flow of refrigerant in a cooling operation.

FIG. 5 is a diagram showing the flow of refrigerant in the cooling operation. In the cooling operation, controller 100 switches four-way valve 2 such that the discharge side of compressor 1 is in communication with outdoor heat exchanger 6 while the suction side of compressor 1 is in communication with indoor heat exchanger 3, as shown in FIG. 5. The vapor refrigerant raised in temperature and pressure in compressor 1 passes through four-way valve 2 and flows into outdoor heat exchanger 6. Outdoor heat exchanger 6 functions as a condenser at this time. High-temperature and high-pressure vapor refrigerant releases heat to the outdoor air introduced into outdoor heat exchanger 6 by an outdoor blower (not shown). Thereby, the vapor refrigerant condenses into high-pressure liquid refrigerant.

The high-pressure liquid refrigerant passes through expansion valve 4b, and thereby expands and turns into gas-liquid two-phase refrigerant of low-temperature and low-pressure, which then flows into heat storage body 5. After a prescribed time period has elapsed since the start of the cooling operation, heat storage body 5 is in temperature equilibrium with the refrigerant flowing through the heat storage body. Thus, no heat is transmitted and received between the heat storage body and the refrigerant. Then, the refrigerant flows into expansion valve 4a. In the cooling operation, expansion valve 4a is basically set to the maximum degree of opening such that the pressure loss before and behind expansion valve 4a is minimized.

The refrigerant having passed through expansion valve 4a flows into indoor heat exchanger 3. Indoor heat exchanger 3 functions as an evaporator at this time. The gas-liquid two-phase refrigerant of low-temperature and low-pressure absorbs heat from the indoor air introduced into indoor heat exchanger 3 by an indoor blower (not shown). Thereby, the gas-liquid two-phase refrigerant evaporates and turns into low-pressure vapor refrigerant. Then, the low-pressure vapor refrigerant is suctioned into compressor 1 through four-way valve 2. The refrigerant subsequently circulates through a refrigeration cycle in the same manner as described above.

(Defrosting Preparation Operation)

When the outdoor air temperature becomes lower than a prescribed temperature (for example, 7° C.) in the heating operation of the refrigeration cycle apparatus, the temperature of outdoor heat exchanger 6 becomes lower than 0° C. Then, frost forms on outdoor heat exchanger 6. Frost formed on outdoor heat exchanger 6 blocks an air flow passage to thereby deteriorate the heating performance Thus, the defrosting operation for melting the frost has to be performed at regular time intervals.

However, long-continued defrosting operation deteriorates the comfortableness inside the room. Thus, in the present embodiment, an amount of heat stored in heat storage body 5 is utilized in the defrosting operation in order to shorten the defrosting time and to shorten the starting up time of the heating operation.

For example, when frost forms on a fin of outdoor heat exchanger 6 to serve as resistance against heat transfer or ventilation during the heating operation, pressure Ps of the refrigerant suctioned into compressor 1, the temperature of the refrigerant suctioned into compressor 1 or the temperature of the refrigerant at the outlet of outdoor heat exchanger 6 is decreased. When pressure Ps of the refrigerant suctioned into compressor 1, the temperature of the refrigerant suctioned into compressor 1 or the temperature of the refrigerant at the outlet of outdoor heat exchanger 6 becomes equal to or less than a prescribed value, controller 100 determines that the defrosting operation needs to be performed.

Conventionally, the following technique is known. Specifically, in the defrosting operation, four-way valve 2 is switched from the heating operation side to the cooling operation side, so that the high-temperature and high-pressure vapor refrigerant discharged from compressor 1 is caused to flow into outdoor heat exchanger 6, thereby melting the frost on outdoor heat exchanger 6.

However, when four-way valve 2 is switched from the heating side to the cooling side to perform a defrosting operation without performing a defrosting preparation operation, a failure may occur in compressor 1 due to poor lubrication.

In the defrosting operation, the high-temperature and high-pressure refrigerant discharged from compressor 1 flows into outdoor heat exchanger 6, melts the frost formed on outdoor heat exchanger 6, releases heat, and then condenses into low-temperature liquid refrigerant, which then passes sequentially through the refrigerant circuit and flows into indoor heat exchanger 3. At this time, the indoor blower stops blowing air in order to prevent cold air from blowing into the room. Thus, the refrigerant is not sufficiently evaporated and is suctioned into compressor 1 while being kept in the two-phase state. In other words, when the defrosting preparation operation is not performed, the liquid refrigerant is poorly evaporated and thereby suctioned into compressor 1. Thus, due to mixing with the liquid refrigerant, the lubricating oil is reduced in viscosity, which may lead to poor lubrication.

Furthermore, when compressor 1 suctions the refrigerant kept in the two-phase state, the temperature of the refrigerant discharged from compressor 1 is lowered, thereby lowering the temperature of the refrigerant supplied to outdoor heat exchanger 6 during the defrosting operation. This deteriorates the defrosting performance, thereby also causing a problem that the defrosting operation time is lengthened.

Therefore, in the present embodiment, in order to shorten the defrosting operation and to prevent the liquid refrigerant from being suctioned into the compressor during the defrosting operation, the defrosting preparation operation is performed before the heating operation is shifted to the defrosting operation.

In the defrosting preparation operation, the refrigerant flows in the same direction as that in the heating operation state shown in FIG. 4. However, the defrosting preparation operation is different from the heating operation in that the degree of opening of expansion valve 4a is greater than that during the heating operation, and in that the degree of opening of expansion valve 4b is smaller than that during the heating operation.

This operation raises the pressure of the refrigerant passing through heat storage body 5 and also raises the refrigerant saturation temperature, so that heat can be stored in heat storage body 5. The temperature of the refrigerant flowing out of indoor heat exchanger 3 during the heating operation is about 40° C. In this case, heat storage body 5 can store heat up to 40° C. When pressure loss occurs before and behind expansion valve 4a during the defrosting preparation operation, the temperature of the refrigerant lowers, so that the temperature of the stored heat lowers. Accordingly, it is preferable that expansion valve 4a is fully opened during the defrosting preparation operation.

The defrosting preparation operation may be started when pressure Ps of the refrigerant suctioned into compressor 1, the temperature of the refrigerant suctioned into compressor 1, or the temperature of the refrigerant at the outlet of outdoor heat exchanger 6 becomes equal to or less than a prescribed value during the heating operation, or may be started after a prescribed time period of the heating operation has elapsed (for example, 60 minutes).

Furthermore, when storage of heat in heat storage body 5 is completed, and heat storage body 5 is brought into thermal equilibrium with the refrigerant flowing through heat storage body 5, no heat is transmitted and received between heat storage body 5 and the refrigerant. Thereby, no influence is exerted upon the heating ability and performance Thus, for the preparation of the defrosting operation that will be required, the defrosting preparation operation may be started, for example, when the indoor temperature reaches a target temperature during the heating operation. The target temperature used herein means an indoor temperature set value of the refrigeration cycle apparatus that is set by a user.

The defrosting preparation operation may be ended when it is determined that heat is sufficiently stored in heat storage body 5 since the difference between the measured temperature of heat storage body 5 and the temperature of indoor heat exchanger 3 becomes equal to or less than a prescribed value, or may be ended after a prescribed time period of the defrosting preparation operation has elapsed (for example, after 5 minutes).

Furthermore, when storage of heat in heat storage body 5 is completed and heat storage body 5 is brought into thermal equilibrium with the refrigerant passing through heat storage body 5, no heat is transmitted and received between the heat storage body and the refrigerant. Thereby, no influence is exerted upon the heating ability and performance. Accordingly, the defrosting preparation operation may be continued until it is determined that outdoor heat exchanger 6 needs to be defrosted. In other words, the above-mentioned condition for ending the defrosting preparation operation does not have to be set, but the defrosting preparation operation may be continued until defrosting is started.

The defrosting operation is performed after the defrosting preparation operation except for the case where a user issues a command to stop the operation, the case where abnormal stop occurs in terms of refrigeration cycle control, and the like.

(Defrosting Operation)

Figure 6:
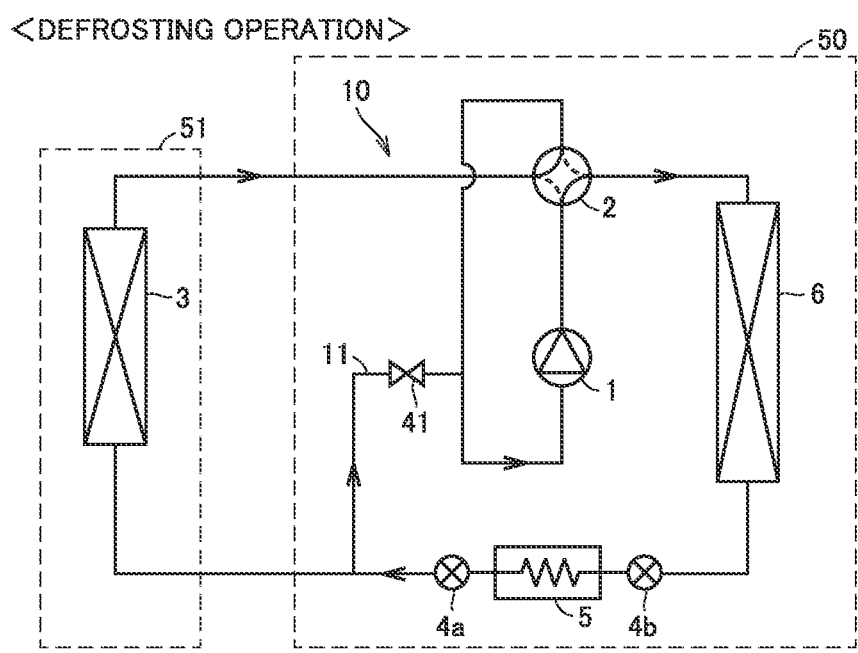
FIG. 6 is a diagram showing the flow of refrigerant in a defrosting operation.

FIG. 6 is a diagram showing the flow of refrigerant in a defrosting operation. In the defrosting operation, four-way valve 2 is switched such that the discharge side of compressor 1 is in communication with outdoor heat exchanger 6 while the suction side of compressor 1 is in communication with indoor heat exchanger 3, and on-off valve 41 is brought into an opened state. The vapor refrigerant that is raised in temperature and pressure by compressor 1 passes through four-way valve 2 and flows into outdoor heat exchanger 6. Outdoor heat exchanger 6 functions as a condenser at this time. The high-temperature and high-pressure vapor refrigerant melts the frost on outdoor heat exchanger 6, thereby releasing heat and condensing into low-temperature liquid refrigerant.

In addition, in order to allow the condensation heat of the refrigerant to be efficiently used for defrosting without being used for heating the outdoor air, the outdoor blower (not shown) is generally not operated during the defrosting operation.

The low-temperature liquid refrigerant having an amount of heat used for defrosting passes through expansion valve 4b and arrives at heat storage body 5. Heat storage body 5 stores heat during the defrosting preparation operation and the temperature of heat storage body 5 becomes high. Thus, heat storage body 5 functions as an evaporator. As a result of heat exchange with heat storage body 5, the low-temperature liquid refrigerant evaporates and turns into vapor refrigerant.

The vapor refrigerant flowing out of heat storage body 5 passes through expansion valve 4a, then passes through bypass path 11 and on-off valve 41, and is suctioned into compressor 1. During the defrosting operation, the refrigerant subsequently circulates through a refrigeration cycle in the same manner as described above.

In addition, the refrigerant circuit extending from expansion valve 4a through indoor heat exchanger 3 and four-way valve 2 to compressor 1 is longer in pipe and greater in pressure loss than bypass path 11. Thus, the refrigerant hardly flows through this refrigerant circuit even though the circuit is not closed by a valve or the like during the defrosting operation.

It is preferable that the degree of opening of expansion valve 4a and the degree of opening of expansion valve 4b each are greater as much as possible during the defrosting operation. This is because, as the pressure loss in each of expansion valves 4a and 4b is smaller, the density of the refrigerant suctioned into compressor 1 is greater, and the amount of the circulating refrigerant is larger, with the result that the defrosting time is shortened.

On the other hand, for example, in the case where a differential pressure oil supply system is employed as a lubricating oil supply system inside compressor 1, the minimum differential pressure required for operations may be set for compressor 1. In this case, it is preferable that not expansion valve 4a but expansion valve 4b is reduced in degree of opening during the defrosting operation. This is because pressure loss of the refrigerant mainly occurs on the expansion valve 4b side, so that the temperature of the refrigerant passing through heat storage body 5 is lowered, thereby increasing the rate and the amount of heat released from heat storage body 5 to the refrigerant.

Furthermore, when the suction pressure of compressor 1 is relatively low even though the temperature of the refrigerant suctioned into compressor 1 is relatively high, the temperature of the refrigerant discharged from compressor 1 may rise to a value equal to or higher than a predetermined protection value (for example, 120° C.). In this case, the amount of heat released from heat storage body 5 needs to be temporarily reduced to lower the temperature of the refrigerant suctioned into compressor 1 to an appropriate temperature. In this case, by reducing the degree of opening of expansion valve 4a and increasing the degree of opening of expansion valve 4b, the temperature of the refrigerant passing through heat storage body 5 can be raised. In this case, the temperature difference between heat storage body 5 and the refrigerant passing through heat storage body 5 is reduced. Accordingly, the amount of heat received by the refrigerant from heat storage body 5 is reduced. Thus, the temperature of the refrigerant suctioned into compressor 1 can be lowered to an appropriate value.

In the present embodiment, heat storage body 5 is disposed on the refrigerant circuit between expansion valves 4a and 4b each having an adjustable degree of opening. Thereby, the pressure and the temperature of the refrigerant passing through heat storage body 5 can be arbitrarily controlled. Accordingly, since the amount of heat transmitted and received between heat storage body 5 and the refrigerant can be controlled, the defrosting operation can be immediately performed, and the compressor can be operated within an appropriate operation range.

The defrosting operation may be ended when the measured temperature of the pipe through which refrigerant flows out of outdoor heat exchanger 6 becomes equal to or higher than a prescribed temperature (for example, equal to or higher than 5° C.), or may be ended after a prescribed time period has elapsed since the start of the defrosting operation (for example, after 5 minutes).

(Shift from Defrosting Operation to Heating Operation)

When the defrosting operation is shifted to the heating operation, four-way valve 2 is switched from the cooling side to the heating side while on-off valve 41 is closed, as shown in FIG. 4. Also, the degree of opening of expansion valve 4a is reduced while expansion valve 4b is preferably fully opened.

In this case, the pressure loss of the refrigerant occurring in expansion valve 4a is greater than the pressure loss of the refrigerant occurring in expansion valve 4b. Accordingly, the pressure of the refrigerant passing through heat storage body 5 is reduced, and heat storage body 5 functions as an evaporator.

Therefore, when, even after heat storage body 5 is utilized as a defrosting heat source, the temperature of heat storage body 5 is higher than the outdoor air temperature and heat storage body 5 can be utilized as a heat source for the heating operation, the increasing rate of the temperature of air blown out of indoor unit 51 can be accelerated in the heating operation.

Figure 7:
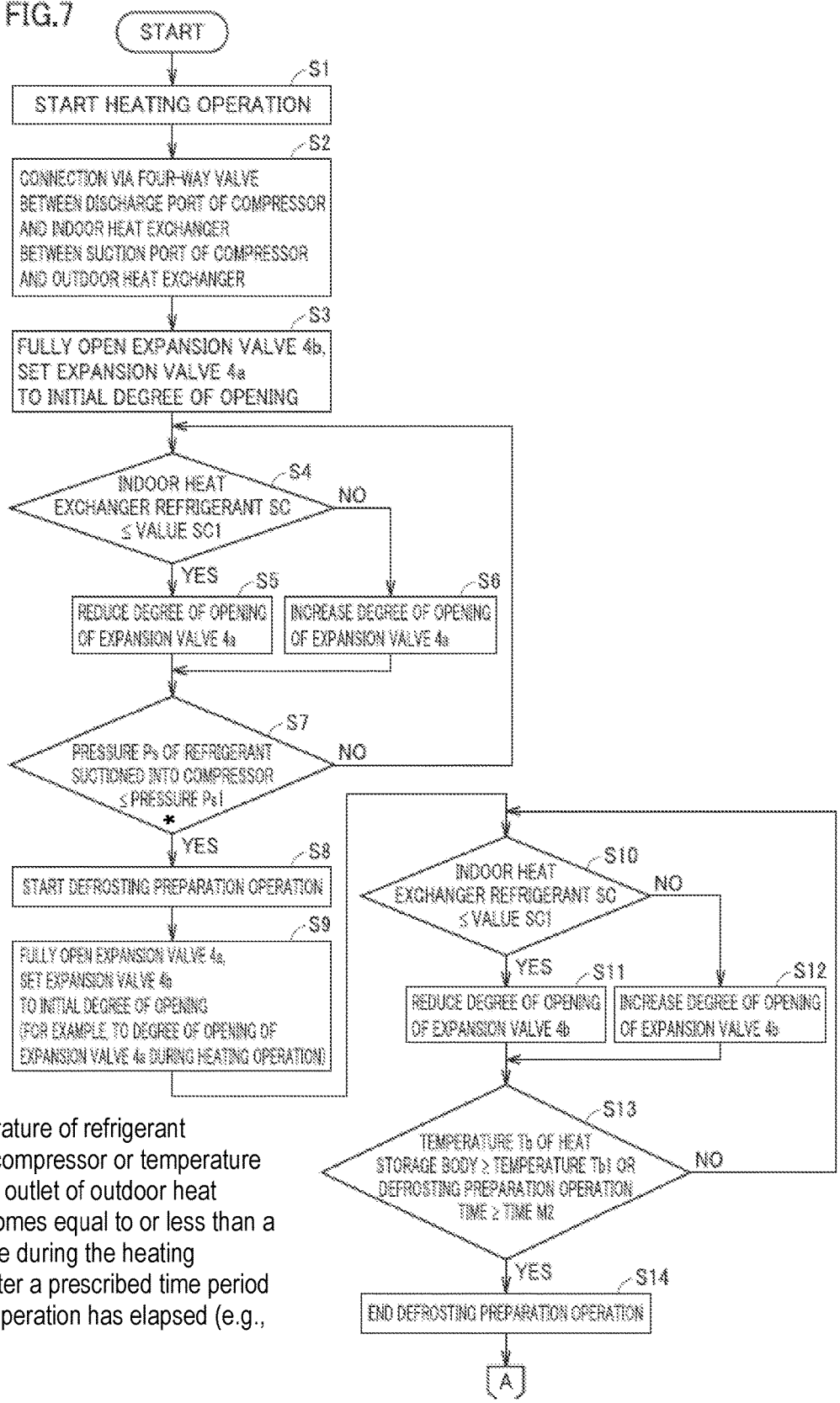
FIG. 7 is a flowchart (first half) for illustrating an example of control for switching an operation.
Figure 8:
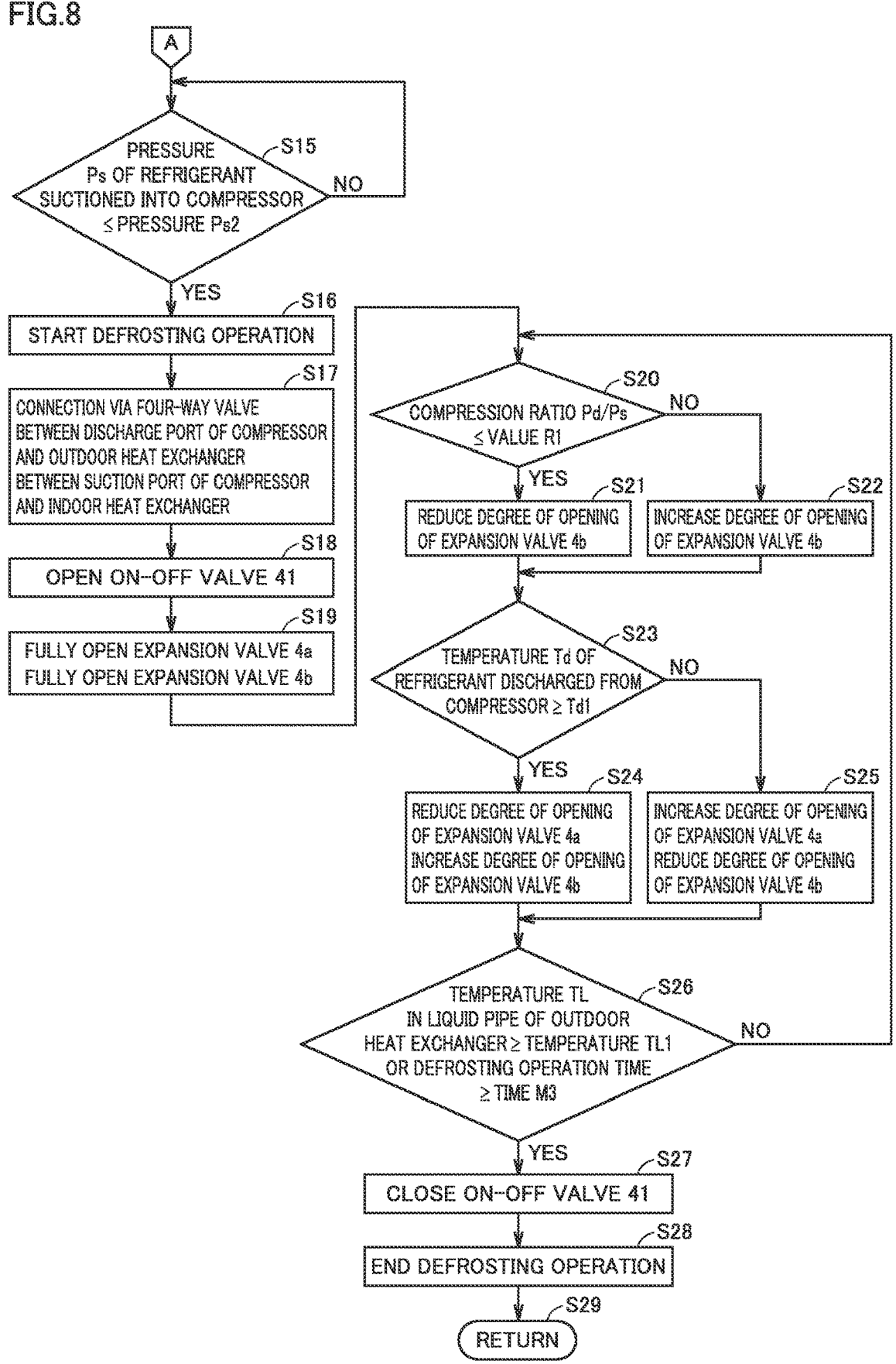
FIG. 8 is a flowchart (latter half) for illustrating an example of control for switching an operation.

FIG. 7 is a flowchart (first half) for illustrating an example of control for switching an operation performed by controller 100. FIG. 8 is a flowchart (latter half) for illustrating an example of control for switching an operation performed by controller 100.

In response to the command to start the heating operation from a user's remote controller and the like, controller 100 starts the process in the flowchart shown in FIG. 7 (S1). In step S2, controller 100 sets four-way valve 2 to establish connection such that the discharge port of compressor 1 is in communication with indoor heat exchanger 3 while the suction port of compressor 1 is in communication with outdoor heat exchanger 6.

Then, in step S3, controller 100 controls expansion valve 4b to be fully opened and controls expansion valve 4a to be set to the initial degree of opening. When the refrigerant is circulated by compressor 1, indoor heat exchanger 3 functions as a condenser.

In the heating operation, the expansion valve is generally controlled based on the degree of subcooling (SC) of the indoor heat exchanger. In the present embodiment, subcooling control is performed in steps S4 to S7 by adjusting the degree of opening of expansion valve 4a.

In step S4, controller 100 determines whether or not a degree of subcooling SC of indoor heat exchanger 3 is equal to or less than a determination value SC1 (a first value SC1). In this case, controller 100 calculates the degree of subcooling SC of the refrigerant in indoor heat exchanger 3 in the following manner First, controller 100 obtains a pressure value of a pressure sensor HS1 on the refrigerant discharge side of compressor 1, and calculates a refrigerant saturation temperature Tdsat corresponding to this pressure value. Then, controller 100 obtains a temperature value Tco of a thermistor THco disposed at the outlet portion of indoor heat exchanger 3. Controller 100 defines the difference between two temperatures (Tdsat−Tco) as the degree of subcooling SC.

When SC≤SC1 is satisfied in step S4 (YES in S4), controller 100 reduces the degree of opening of expansion valve 4a in step S5. When SC≤SC1 is not satisfied (NO in S4), controller 100 increases the degree of opening of expansion valve 4a in step S6.

The process in step S4 or S5 is followed by the process in step S7. In step S7, controller 100 determines whether or not pressure Ps of the refrigerant suctioned into compressor 1 is equal to or less than determination pressure Ps1. In this case, pressure Ps of the refrigerant suctioned into compressor 1 is derived from the pressure value of a pressure sensor LS1 disposed at the suction port of compressor 1.

In place of the determination in step S7, any condition may be employed from among the following three determination conditions including: 1) a temperature Ts of refrigerant suctioned into compressor 1≤a determination temperature Ts1; 2) a temperature Teo of refrigerant at the outlet of outdoor heat exchanger 6≤a determination temperature Teo1; and 3) heating operation time≥determination time M1. In this case, temperature Ts of the suctioned refrigerant can be the temperature value of a thermistor THs installed in the suction pipe of compressor 1. Furthermore, temperature Teo of refrigerant at the outlet of outdoor heat exchanger 6 can be the temperature value of a thermistor THeo installed in the outlet pipe of outdoor heat exchanger 6.

When the determination condition is not satisfied in step S7 (NO in S7), the process subsequent to step S4 is performed again. On the other hand, when the determination condition is satisfied in step S7 (YES in S7), the process proceeds to step S8, in which the defrosting preparation operation is started.

When the defrosting preparation operation is started, first in step S9, controller 100 controls expansion valve 4a to be fully opened and controls expansion valve 4b to be set to the initial degree of opening (for example, to the degree of opening of expansion valve 4a during the heating operation).

Also in the defrosting preparation operation, the expansion valve is controlled based on the degree of subcooling (SC) of the indoor heat exchanger in the same manner as in the heating operation. In the defrosting preparation operation, subcooling control is performed in steps S10 to S13 by adjusting the degree of opening of expansion valve 4b.

In step S10, controller 100 determines whether or not the degree of subcooling SC of indoor heat exchanger 3 is equal to or less than determination value SC1. Since the method of calculation the degree of subcooling SC is the same as that in step S4, the description thereof will not be repeated.

When SC≤SC1 is satisfied in step S10 (YES in S10), controller 100 reduces the degree of opening of expansion valve 4b in step S11. When SC≤SC1 is not satisfied in step S10 (NO in S10), controller 100 increases the degree of opening of expansion valve 4b in step S12.

The process in step S11 or S12 is followed by the process in step S13. In step S13, controller 100 determines whether or not a temperature Tb of heat storage body 5 is equal to or higher than a determination temperature Tb1, or whether or not the defrosting preparation operation time is equal to or longer than determination time M2. Temperature Tb of heat storage body 5 can be the temperature value of a thermistor THb attached to heat storage body 5.

When the determination condition is not satisfied in step S13 (NO in S13), the process subsequent to step S10 is performed again. On the other hand, when the determination condition is satisfied in step S13 (YES in S13), the process proceeds to step S14, in which the defrosting preparation operation is ended.

Then, referring to FIG. 8, in step S15, controller 100 determines whether or not pressure Ps of the refrigerant suctioned into compressor 1 is equal to or less than a second determination pressure value Ps2.

In place of the determination in step S15, any condition may be employed from among the following two determination conditions including: 1) temperature Ts of refrigerant suctioned into compressor 1≤a second determination temperature Ts2; and 2) a temperature Teo of refrigerant at the outlet of outdoor heat exchanger 6≤a second determination temperature Teo2. Also, the defrosting operation may be started immediately after the defrosting preparation operation is ended.

Until the determination condition in step S15 is satisfied, the defrosting operation is not started, but the heating operation is performed in the state where heat is stored in heat storage body 5 (NO in S15). When the determination condition is satisfied in step S15, the process proceeds to step S16, in which the defrosting operation is started.

In step S17, controller 100 sets four-way valve 2 to establish connection such that the discharge port of compressor 1 is in communication with outdoor heat exchanger 6 while the suction port of compressor 1 is in communication with indoor heat exchanger 3. Furthermore, in step S18, controller 100 opens on-off valve 41 provided in bypass path 11.

Then, in step S19, controller 100 controls expansion valve 4a and expansion valve 4b to be fully opened. When the refrigerant is circulated by compressor 1, indoor heat exchanger 3 functions as an evaporator.

In the defrosting operation, in the following steps S20 to S25, controller 100 adjusts the degree of opening of each of expansion valve 4a and expansion valve 4b, thereby adjusting the amount of heat released from heat storage body 5.

First in step S20, controller 100 obtains pressure Ps of the refrigerant suctioned into compressor 1 based on the pressure value of pressure sensor LS1, and obtains pressure Pd of the refrigerant discharged from compressor 1 based on the pressure value of pressure sensor HS1. Then, a refrigerant compression ratio Pd/Ps is calculated, and it is determined whether or not this refrigerant compression ratio is equal to or less than a determination value R1.

When Pd/Ps≤R1 is satisfied in step S20 (YES in S20), controller 100 reduces the degree of opening of expansion valve 4b in step S21. When Pd/Ps R1 is not satisfied in step S20 (NO in S20), controller 100 increases the degree of opening of expansion valve 4b in step S22. The process in step S21 or S22 is followed by the process in step S23.

In step S23, controller 100 obtains a temperature Td of refrigerant discharged from compressor 1 based on the detection value of a temperature sensor THd. Then, controller 100 determines whether or not temperature Td of refrigerant discharged from compressor 1 is equal to or higher than a determination temperature Td1.

When Td≥Td1 is satisfied in step S23 (YES in S23), then in step S24, controller 100 reduces the degree of opening of expansion valve 4a and increases the degree of opening of expansion valve 4b. When Td≥Td1 is satisfied, excessive heat is released from heat storage body 5. Accordingly, the degree of opening of expansion valve 4a is reduced to thereby reduce the amount of heat released from heat storage body 5.

On the other hand, when Td≥Td1 is not satisfied in step S23 (NO in S23), then in step S25, controller 100 increases the degree of opening of expansion valve 4a, and reduces the degree of opening of expansion valve 4b. The process in step S24 or S25 is followed by the process in step S26.

In step S26, controller 100 obtains a temperature TL in a liquid pipe of outdoor heat exchanger 6 from a thermistor THL. Controller 100 determines whether or not temperature TL is equal to or higher than a determination temperature TL1, or determines whether or not the defrosting operation time is equal to or longer than determination time M3. When each of these two conditions is not satisfied in step S26 (NO in S26), the process is returned to step S20. On the other hand, when at least one of these two conditions is satisfied in step S26 (YES in S26), controller 100 causes the process to proceed to step S27, in which on-off valve 41 is closed. Then, controller 100 ends the defrosting operation in step S28. Then, in step S29, the process is returned to the process of starting the heating operation.

As described above, in the present embodiment, heat storage body 5 is disposed on the refrigerant circuit between expansion valves 4a and 4b each having an adjustable degree of opening, so that the pressure and the temperature of the refrigerant passing through heat storage body 5 can be arbitrarily controlled. Accordingly, since the amount of heat transmitted and received between heat storage body 5 and the refrigerant can be controlled, a defrosting operation can be immediately performed, and the compressor can be operated within an appropriate operation range.

Second Embodiment

Figure 9:
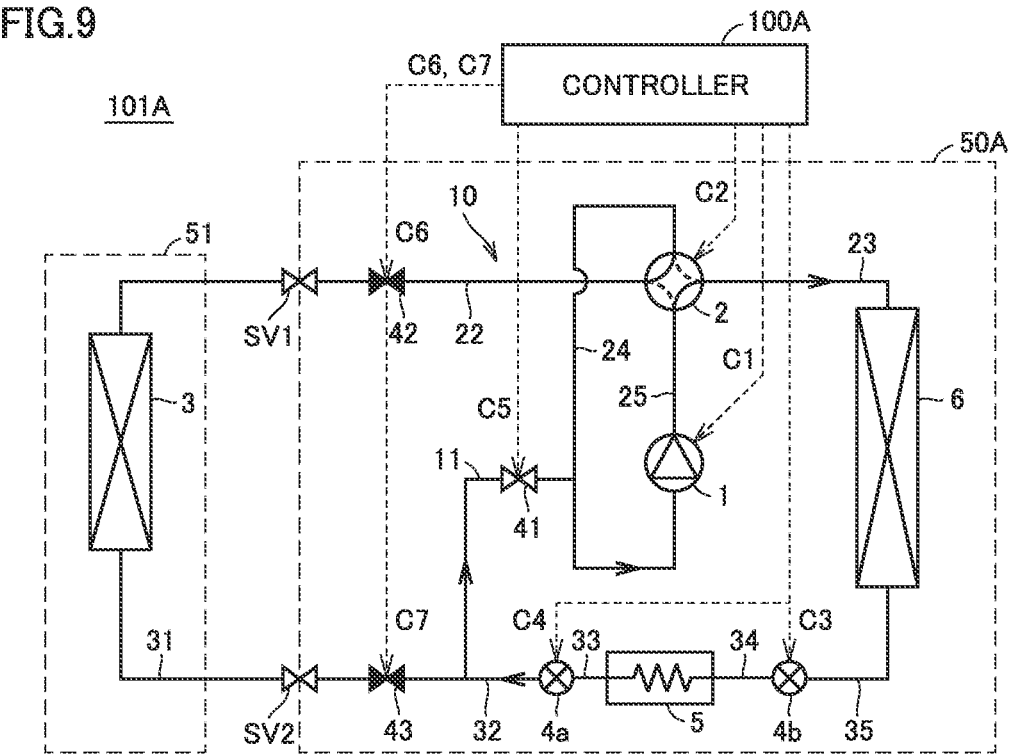
FIG. 9 is a refrigerant circuit diagram of a refrigeration cycle apparatus in the second embodiment.

FIG. 9 is a refrigerant circuit diagram of a refrigeration cycle apparatus in the second embodiment. As shown in FIG. 9, in addition to the configuration of refrigeration cycle apparatus 101, a refrigeration cycle apparatus 101A includes: a second on-off valve 42 provided in second refrigerant pipe 22; and a third on-off valve 43 provided in the first portion (31, 32) of first refrigerant pipe 21 so as to be located close to indoor heat exchanger 3 with respect to the branch point to bypass path 11. Each of second on-off valve 42 and third on-off valve 43 is opened during the heating operation and closed during the defrosting operation.

Refrigeration cycle apparatus 101A further includes a first stop valve SV1 provided in second refrigerant pipe 22, and a second stop valve SV2 provided in the first portion (31, 32) of first refrigerant pipe 21. The stop valve is opened and closed by a work operator with a wrench in the case of installation or relocation of a refrigeration cycle apparatus. In contrast, second on-off valve 42 and third on-off valve 43 each serve as a solenoid valve that can be opened and closed by a controller 100A during an operation. First stop valve SV1 is located close to indoor heat exchanger 3 with respect to second on-off valve 42. Second stop valve SV2 is located close to indoor heat exchanger 3 with respect to third on-off valve 43.

In other words, in the present embodiment, on-off valve 42 is provided on the refrigerant circuit so as to be located between four-way valve 2 and indoor heat exchanger 3 while on-off valve 43 is provided on the refrigerant circuit so as to be located between indoor heat exchanger 3 and expansion valve 4a. In the present embodiment, on-off valves 42 and 43 are opened during the heating operation, the defrosting preparation operation and the cooling operation, and closed during the defrosting operation.

When the refrigerant becomes excessive during the defrosting operation, the amount of liquid refrigerant passing through heat storage body 5 during the defrosting operation is increased. Thus, this liquid refrigerant cannot be completely evaporated with the amount of heat stored in heat storage body 5, so that the liquid refrigerant may be suctioned into the compressor. In the second embodiment, the refrigerant existing inside indoor heat exchanger 3 and the indoor/outdoor connection pipe is sealed therein during the defrosting operation. Thereby, refrigerant can be prevented from becoming excessive in the refrigeration cycle apparatus in the defrosting operation.

Furthermore, by sealing the refrigerant in the indoor heat exchanger during the defrosting operation, the motive power and the amount of heat used for conveying the liquid refrigerant from the outdoor unit to the indoor unit can be reduced during a shift to the heating operation. Thus, the increasing rate of the temperature of air blown out of the heating indoor unit can be accelerated.

Third Embodiment

Figure 10:
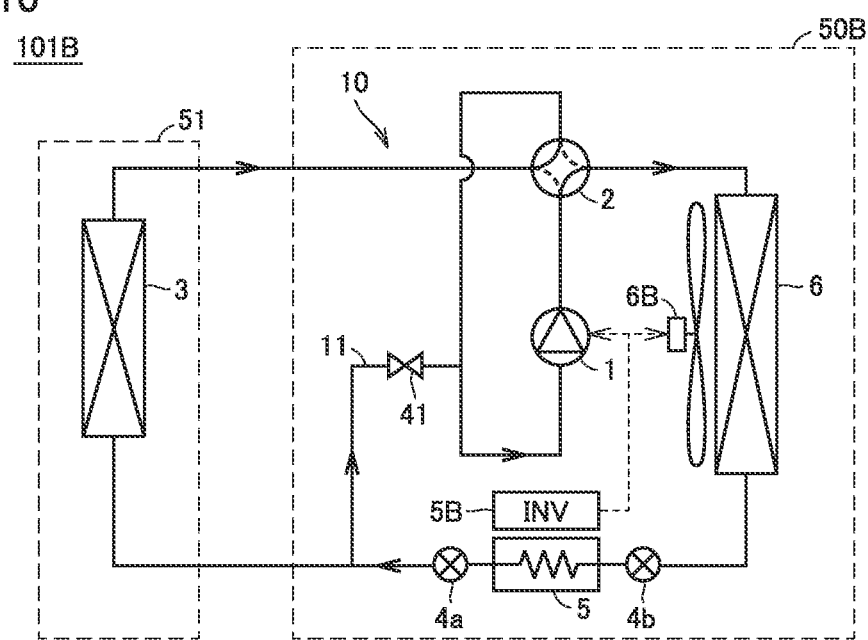
FIG. 10 is a refrigerant circuit diagram of a refrigeration cycle apparatus in the third embodiment.

FIG. 10 is a refrigerant circuit diagram of a refrigeration cycle apparatus in the third embodiment. As shown in FIG. 10, in addition to the configuration of refrigeration cycle apparatus 101 in the first embodiment, a refrigeration cycle apparatus 101B further includes an inverter module 5B for driving compressor 1 or for driving an outdoor blower 6B, inverter module 5B being disposed to be in contact with heat storage body 5. For example, inverter module 5B includes: a power device such as a power MOSFET and an insulated gate bipolar transistor (IGBT) for controlling electric power; an intelligent power module (IPM) incorporating its drive circuit and a self protection circuit; and the like.

A power element inside inverter module 5B generates heat in accordance with the value of the current flowing therethrough. Cooling is required such that the power element is set to be equal to or lower than a predetermined temperature (for example, equal to or lower than 120° C.) in order to prevent thermal runaway. By bringing inverter module 5B into contact with heat storage body 5, heat generated from the inverter element can be utilized as a defrosting heat source during the defrosting operation while cooling inverter module 5B.

In the above-described first to third embodiments, it is preferable that the saturation temperature of the refrigerant suctioned into compressor 1 is controlled to range between −20° C. and −45° C. during the defrosting operation. When the amount of heat stored in heat storage body 5 is exhausted, only the work of compressing the refrigerant by compressor 1 serves as a defrosting heat source. The refrigerant saturation temperature in outdoor heat exchanger 6 during the defrosting operation ranges from 0° C. to about +5° C. In this case, pressure Ps of the refrigerant suctioned into compressor 1 with the maximum defrosting performance exists in the range between −20° C. and −45° C. in terms of the refrigerant saturation temperature, for example, in the case of refrigerant such as R32 and 410A. This results from the following reasons. Specifically, low pressure Ps of the refrigerant suctioned into compressor 1 leads to a low density of the refrigerant suctioned into compressor 1, and thus, the work of compressor 1 is decreased due to an insufficient amount of circulating refrigerant. Also, high pressure Ps of the refrigerant suctioned into compressor 1 leads to a small differential pressure of the refrigerant before and behind compressor 1, and thus, the work of compressor 1 is decreased.

Furthermore, in the above-described first to third embodiments, an electric heater may be provided inside heat storage body 5 or in contact with heat storage body 5. Thereby, a defrosting heat source can be assisted in the case where the amount of heat stored in heat storage body 5 is insufficient or in the case where a sufficiently large-sized heat storage body 5 cannot be provided in consideration of space and cost.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

The invention claimed is:

1. A refrigeration cycle apparatus comprising a controller and a refrigerant circuit through which refrigerant circulates in a forward direction in a heating operation sequentially through a compressor, a four-way valve, an indoor heat exchanger, a first expansion valve, a heat storage body, a second expansion valve, and an outdoor heat exchanger, and the four-way valve, and back to the compressor, and refrigerant circulates in an opposite direction to the forward direction in a defrosting operation,
the refrigerant circuit comprising
a first refrigerant pipe extending from the indoor heat exchanger through the first expansion valve, the heat storage body and the second expansion valve to the outdoor heat exchanger,
a second refrigerant pipe connecting the four-way valve and the indoor heat exchanger,
a third refrigerant pipe connecting the four-way valve and the outdoor heat exchanger,
a fourth refrigerant pipe connecting a suction port of the compressor and the four-way valve,
a bypass path branching off from a first portion in the first refrigerant pipe and leading to the fourth refrigerant pipe, the first portion connecting the indoor heat exchanger and the first expansion valve,
a first on-off valve provided in the bypass path,
a second on-off valve provided in the second refrigerant pipe; and
a third on-off valve provided in the first portion of the first refrigerant pipe so as to be located between the indoor heat exchanger and a branch point to the bypass path, wherein
the controller controls each of the second on-off valve and the third on-off valve to open during the heating operation and close during the defrosting operation.

2. The refrigeration cycle apparatus according to claim 1, wherein
the four-way valve is configured to
cause the refrigerant to circulate in the forward direction in the heating operation and
cause the refrigerant to circulate in the opposite direction in the defrosting operation,
wherein the controller is configured to
when the heating operation is shifted to the defrosting operation, perform a defrosting preparation operation in such a manner that, while the first on-off valve is controlled to keep closed, the controller increases a degree of opening of the first expansion valve to larger than that in the heating operation, and reduces a degree of opening of the second expansion valve to smaller than that in the heating operation, and
control the first on-off valve to open in the defrosting operation.

3. The refrigeration cycle apparatus according to claim 2, wherein the controller is further configured to
obtain, from at least one sensor, at least one of a pressure of refrigerant suctioned into the compressor, a temperature of refrigerant suctioned into the compressor, and a temperature of refrigerant at an outlet of the outdoor heat exchanger, and
start the defrosting preparation operation
(i) when the at least one of the pressure of refrigerant suctioned into the compressor, the temperature of refrigerant suctioned into the compressor, and the temperature of refrigerant at the outlet of the outdoor heat exchanger becomes smaller than a first value during the heating operation, or
(ii) when a prescribed time period is determined to pass since start of the heating operation.

4. The refrigeration cycle apparatus according to claim 2, wherein the controller is configured to
obtain, from a sensor, an indoor temperature, and
during the heating operation, start the defrosting preparation operation when the indoor temperature is determined to reach a set value set by a user.

5. The refrigeration cycle apparatus according to claim 2, wherein the controller is further configured to
obtain a temperature difference between the heat storage body and an indoor heat exchanger, and
end the defrosting preparation operation
(i) when the temperature difference between the heat storage body and the indoor heat exchanger becomes smaller than a first value during the defrosting preparation operation, or
(ii) when a prescribed time period is determined to pass since start of the defrosting preparation operation.

6. The refrigeration cycle apparatus according to claim 2, wherein the controller is further configured to continue the defrosting preparation operation until the defrosting operation is started.

7. The refrigeration cycle apparatus according to claim 2, wherein
the four-way valve is configured to switch a communication state inside the four-way valve between a first state and a second state, to allow a circulation direction of the refrigerant to be changed,
in the first state,
a discharge port of the compressor is in communication with the second refrigerant pipe, and
a suction port of the compressor is in communication with the third refrigerant pipe, and
in the second state,
the discharge port of the compressor is in communication with the third refrigerant pipe, and
the suction port of the compressor is in communication with the second refrigerant pipe.

8. The refrigeration cycle apparatus according to claim 1, further comprising:
a first stop valve provided in the second refrigerant pipe; and
a second stop valve provided in the first portion of the first refrigerant pipe, wherein the first stop valve is located between the indoor heat exchanger and the second on-off valve, and
the second stop valve is located between the indoor heat exchanger and the third on-off valve.

9. The refrigeration cycle apparatus according to claim 1, further comprising an inverter module for driving the compressor or for driving an outdoor blower, the inverter module being disposed to be in contact with the heat storage body.

* * * * *